(12) United States Patent
Reevell

(10) Patent No.: US 11,930,860 B2
(45) Date of Patent: Mar. 19, 2024

(54) CLEANING TOOL FOR HEATING ELEMENT WITH ROTATION PREVENTION

(71) Applicant: PHILIP MORRIS PRODUCTS S.A., Neuchatel (CH)

(72) Inventor: Tony Reevell, London (GB)

(73) Assignee: Philip Morris Products S.A., Neuchatel (CH)

( * ) Notice: Subject to any disclaimer, the term of this patent is extended or adjusted under 35 U.S.C. 154(b) by 518 days.

(21) Appl. No.: 17/252,355

(22) PCT Filed: Jul. 17, 2019

(86) PCT No.: PCT/EP2019/069199
§ 371 (c)(1),
(2) Date: Dec. 15, 2020

(87) PCT Pub. No.: WO2020/016274
PCT Pub. Date: Jan. 23, 2020

(65) Prior Publication Data
US 2021/0244105 A1 Aug. 12, 2021

(30) Foreign Application Priority Data

Jul. 17, 2018 (EP) .................................... 18183890

(51) Int. Cl.
*A24F 40/85* (2020.01)
*A24F 40/46* (2020.01)
(Continued)

(52) U.S. Cl.
CPC .............. *A24F 40/85* (2020.01); *A24F 40/46* (2020.01); *A24F 40/53* (2020.01); *A46B 5/0091* (2013.01);
(Continued)

(58) Field of Classification Search
CPC ............ B08B 1/002; A46B 2200/3013; A46B 2200/3073; A24F 40/85
See application file for complete search history.

(56) References Cited

U.S. PATENT DOCUMENTS 4,397,326 A  8/1983 Formica
5,878,752 A  3/1999 Adams
(Continued)

FOREIGN PATENT DOCUMENTS

CN  106231931  12/2016
EP  2 201 850  6/2010
(Continued)

OTHER PUBLICATIONS

Office Action issued in Korea for Application No. 10-2020-7036410 dated Feb. 28, 2023 (8 pages). English translation included.
(Continued)

*Primary Examiner* — Natasha N Campbell
(74) *Attorney, Agent, or Firm* — Mueting Raasch Group

(57) ABSTRACT

The present invention relates to a cleaning tool configured for cleaning a heating element (22) of an aerosol-generating device (20). The cleaning tool comprises a handle (10) and a main body (12). The main body comprises one or more cleaning elements (14). The handle is rotatably attached to the main body. The present invention further relates to an aerosol-generating device and a cleaning tool and a method for cleaning a heating element of an aerosol-generating device.

15 Claims, 3 Drawing Sheets

Figure 1:
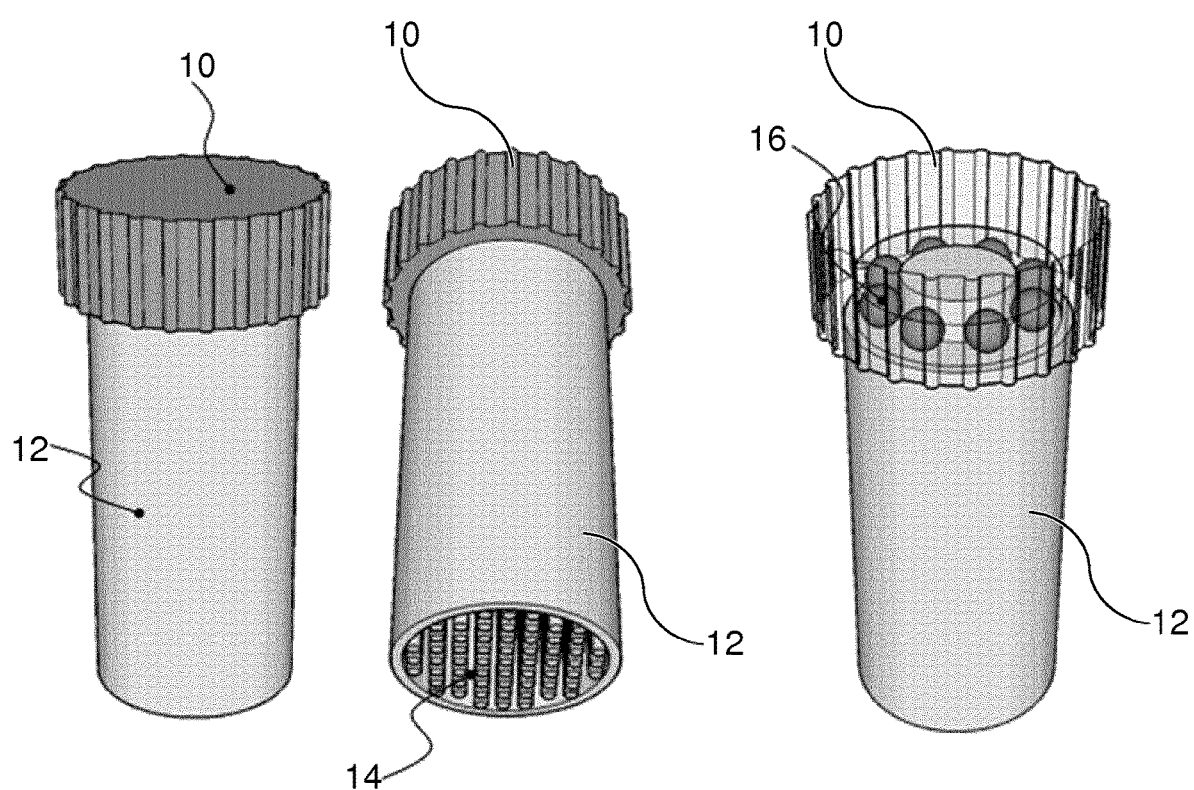

(51) Int. Cl.
    *A24F 40/53*     (2020.01)
    *A46B 5/00*     (2006.01)
    *B08B 1/00*     (2006.01)
    *F16C 17/02*     (2006.01)
    *H05B 3/42*     (2006.01)

(52) U.S. Cl.
    CPC .............. *B08B 1/002* (2013.01); *F16C 17/02* (2013.01); *H05B 3/42* (2013.01); *A46B 2200/3073* (2013.01)

(56) References Cited

U.S. PATENT DOCUMENTS

| | | | |
|---|---|---|---|
| 6,119,700 | A | 9/2000 | Fleischhauer |
| 6,145,514 | A | 11/2000 | Clay |
| 6,347,463 | B1* | 2/2002 | Novak ................... B44D 3/006 34/328 |
| 10,827,782 | B2 | 11/2020 | Fernando |
| 2005/0144745 | A1 | 7/2005 | Russell |
| 2008/0035172 | A1* | 2/2008 | Mindrum ................ A47L 17/04 15/160 |
| 2010/0163063 | A1* | 7/2010 | Fernando ................ A24F 40/50 131/330 |
| 2012/0192895 | A1* | 8/2012 | Shatz .................... A46B 9/028 15/160 |

FOREIGN PATENT DOCUMENTS

| | | |
|---|---|---|
| GB | 2 479 752 | 10/2011 |
| JP | 2018191550 | 12/2018 |
| KR | 10-2011-0096548 | 8/2011 |
| RU | 2292825 | 2/2007 |
| WO | WO 2010/073122 | 7/2010 |
| WO | WO 2015/165709 | 11/2015 |

OTHER PUBLICATIONS

Search Report and Written Opinion for PCT/EP2019/069199 dated Oct. 28, 2019 (13 pages).
International Preliminary Report on Patentability for PCT/EP2019/069199 dated Sep. 28, 2020 (14 pages).
Office Action issued in Russian for Application No. 202014543 dated Nov. 25, 2021 (6 pages). English translation included.

* cited by examiner

CLEANING TOOL FOR HEATING ELEMENT WITH ROTATION PREVENTION

This application is a U.S. National Stage Application of International Application No. PCT/EP2019/069199 filed Jul. 17, 2019, which was published in English on Jan. 23, 2020 as International Publication No. WO 2020/016274 A1. International Application No. PCT/EP2019/069199 claims priority to European Application No. 18183890.5 filed Jul. 17, 2018.

The invention relates to a cleaning tool configured for cleaning a heating element of an aerosol-generating device. Aerosol-generating devices are known which heat but not burn an aerosol-generating substrate such as tobacco. These devices heat the aerosol-generating substrate to a sufficiently high temperature for creating an aerosol for inhalation by the user.

These aerosol-generating devices typically comprise a heating chamber, wherein a heating element is arranged within the heating chamber. An aerosol-generating article comprising the aerosol-generating substrate can be inserted into the heating chamber and heated by the heating element. Generally, after an aerosol-generating article is depleted, the aerosol-generating article is removed from the heating chamber and a fresh aerosol-generating article is inserted. In some aerosol generating devices, an aerosol-generating article is pushed over the heating element and the heating element consequently penetrates into the aerosol-generating substrate of the aerosol-generating article. During removal and insertion of aerosol-generating articles, unwanted residues may remain in the heating chamber and the residues may stick to the heating element. In some aerosol-generating devices, the heating element may be configured as a relatively fragile heating blade. The heating blade may be damaged during cleaning by a user.

Consequently, there is a need for removing unwanted residues from the heating element of an aerosol-generating device while preventing or at least minimizing damage to the heating element.

The present invention proposes a cleaning tool configured for cleaning a heating element of an aerosol-generating device. The cleaning tool comprises a handle and a main body. The main body comprises one or more cleaning elements. The handle is rotatably attached to the main body.

The cleaning tool according to this invention enables cleaning of a heating element arranged in a heating chamber of an aerosol-generating device without damaging the heating element. The cleaning tool can be held and operated by a user utilizing the handle. The user may grip the cleaning tool via the handle and insert the cleaning tool into the heating chamber of the aerosol-generating device. Due to the fact that the handle is rotatably attached to the main body of the cleaning tool which is inserted into the heating chamber of the aerosol-generating device, the main body is not rotated inside of the heating chamber. Without rotatably attaching the handle to the main body, the user may unintentionally rotate the main body during or after insertion of the main body into the heating chamber. Particularly if the heating element has an essentially flat shape such as a heating blade, rotation of the main body may damage the heating element. Preventing rotation of the main body by rotatably attaching the handle to the main body thus facilitates that the heating element can be cleaned in a predefined manner while damage to the heating element is at the same time prevented.

The handle may comprise a knob, which may be rotatable. The handle may have an elongate cylindrical shape. The handle may comprise indentations, grooves or similar elements for facilitating gripping of the handle. The handle may be gripped by the user and rotated. For using the cleaning tool, it is preferably not necessary to rotate the handle. However, rotation of the handle is possible due to the handle being rotatably attached to the main body so that rotation of the handle does not negatively impair operation of the cleaning tool.

The handle may have a diameter which is larger than the diameter of an opening of the heating chamber. The handle may rest against the opening of the heating chamber, when the main body is inserted into the heating chamber. The handle may limit the insertion of the main body into the heating chamber by abutting the heating chamber.

The term "rotatably attached" means that the handle can be rotated with respect to the main body. The handle can be rotated without the main body being also rotated. In other words, the main body remains unmoved during a rotation of the handle. Nevertheless, the main body is attached to the handle such that griping the handle and moving the handle in a translational movement results in the main body being moved similarly mirroring the translational movement of the handle. Hence, the main body may be moved up and down via the handle being moved up and down, while rotation of the handle does not have a movement effect on the main body.

The cleaning tool may further comprise a bearing, wherein the handle is rotatably attached to the main body by means of the bearing. The bearing may be utilized for realizing the handle being rotatably attached to the main body. Hence, the bearing may be configured for enabling free rotation of the handle with respect to the main body. The bearing may be positioned between the handle and the main body. The bearing may be sandwiched between the handle and the main body. The bearing may be covered by one or more of the handle and the main body such that the bearing is protected. Particularly, the bearing may in this way be protected from damage and contamination. The handle may cover the top and side portions of the bearing. The main body may cover to bottom and inner portions of the bearing. The bearing may have a circular shape. The bearing may be arranged in a plane perpendicular to the longitudinal axis of the cleaning tool.

The bearing may be configured as a rotary bearing, preferably a rolling-element bearing, more preferably a ball bearing. Such a bearing enables a particularly small resistance when rotating the handle with respect to the main body. If it is desirable to reduce the number of components or costs, a plain bearing may also be utilized. Other types of bearings such as roller bearings, fluid bearings or magnetic bearings are also conceivable.

The bearing may comprise an outer race and an inner race, wherein the outer race is part of the handle, and wherein the inner race is part of the main body. Preferably, the outer race is an integral part of the handle, and the inner race is an integral part of the main body. The construction of the bearing may thus be simplified. The handle may be manufactured with an integrated outer race. The main body may be manufactured with an integrated inner race. The outer race of the handle may be arranged over the inner race of the main body. Balls or rollers or other suitable elements may be arranged between the outer race and the inner race for forming the bearing.

The main body may have an elongate tubular shape. The main body may have a shape such that the main body may be inserted into a heating chamber of an aerosol-generating device. The outer shape of the main body may mirror the shape of a heating chamber. The main body may have a circular cross-section. The main body may have an outer diameter which essentially corresponds to the inner diameter of the heating chamber such that unwanted residues sticking to the inner surface of the heating chamber are scraped off of the inner surface from the heating chamber during insertion of the main body into the heating chamber.

The cleaning tool may comprise multiple cleaning elements, wherein the cleaning elements may be arranged within the main body. The cleaning elements are preferably firmly attached to the main body. When the handle is rotated, the cleaning elements are not rotated due to the fact that the handle is rotatably attached to the main body. During insertion of the main body into a heating chamber of an aerosol-generating device, the heating element arranged in the heating chamber is cleaning by means of the cleaning elements. The cleaning elements may be protected by the main body. The main body may comprise one or more walls. The one or more walls of the main body may be solid walls. The one or more solid walls of the main body may form a tubular enclosure surrounding the cleaning elements.

The cleaning elements may have an elongate shape and may be arranged parallel to the longitudinal axis of the cleaning tool. Preferably, the cleaning elements have a length such that the cleaning elements reach the base of the heating chamber, when the main body of the cleaning tool is inserted into the heating chamber. The cleaning elements may clean the base of the heating chamber when contacting the base of the heating chamber after the main body has been fully inserted into the heating chamber. The cleaning elements may scrape off unwanted residues of the heating element during insertion of the main body into the heating chamber. The cleaning tool may be configured to be repeatedly inserted into and removed out of the heating chamber of the aerosol-generating device. During multiple insertions, essentially all unwanted residues may be removed.

The cleaning elements may be configured as one or more of brushes, microfiber, cloth and foam. Particularly brushes may optimally remove unwanted residues.

The cleaning elements may be elastic and configured to elastically encompass the heating element of the aerosol generating device, when the cleaning tool is inserted into a heating chamber of the aerosol generating device. The cleaning elements may be spaced apart from each other within the main body such that the heating element would not fit between the cleaning elements would the cleaning elements not be elastic. In this way, all parts of the heating element may be cleaned by the cleaning elements due to the fact that the cleaning elements are pushed apart by the heating element during insertion of the main body into the heating chamber. Particularly if the heating element has a tip, this tip can then also be cleaned by the cleaning elements. The heating element may for example have a tip, when the heating element is configured as a heating pin or heating blade. Configuring the cleaning elements elastic also prevents damage to the heating elements during insertion of the cleaning elements into the heating chamber together with the main body.

The distribution density or number of cleaning elements in the main body may increase towards the longitudinal axis of the cleaning tool. In other words, more cleaning elements may be centrally aligned in the main body compared to a region near the walls of the main body. This arrangement is particularly beneficial if the heating element to be cleaned is centrally aligned in the heating chamber.

The invention also relates to a system comprising an aerosol-generating device and a cleaning tool as described above. The aerosol generating device comprises a heating chamber and a heating element. The heating element is arranged in the heating chamber. The cleaning tool is configured to be inserted into the heating chamber for cleaning the heating element.

The heating element may be centrally aligned in the heating chamber. The heating element may be a heating pin or heating blade. The heating element may be a resistive heater. The heating chamber may have a cylindrical shape.

The invention further relates to a method for cleaning a heating element of an aerosol-generating device by means of a cleaning tool, the method comprising the following steps:
 i) providing a cleaning tool comprising a handle and a main body, wherein the main body comprises one or more cleaning elements, and wherein the handle is rotatably attached to the main body, and
 ii) inserting the cleaning tool into a heating chamber of the aerosol-generating device, thereby cleaning the heating element arranged in the heating chamber.

The cleaning tool provided in step i) may be substantially as above described.

Figure 2:
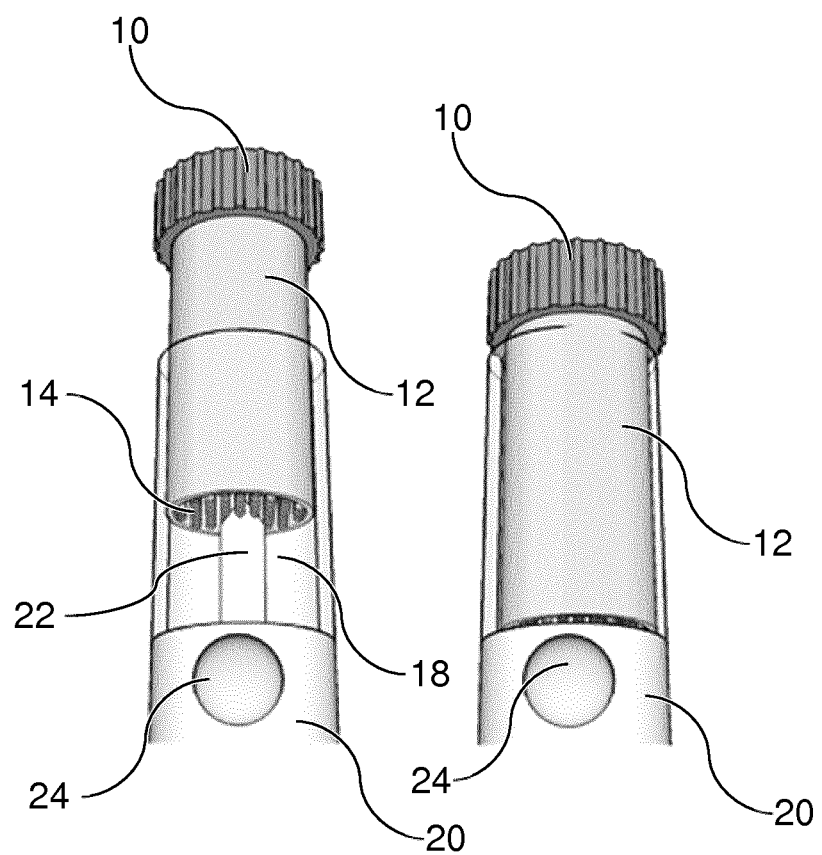
Figure 3:
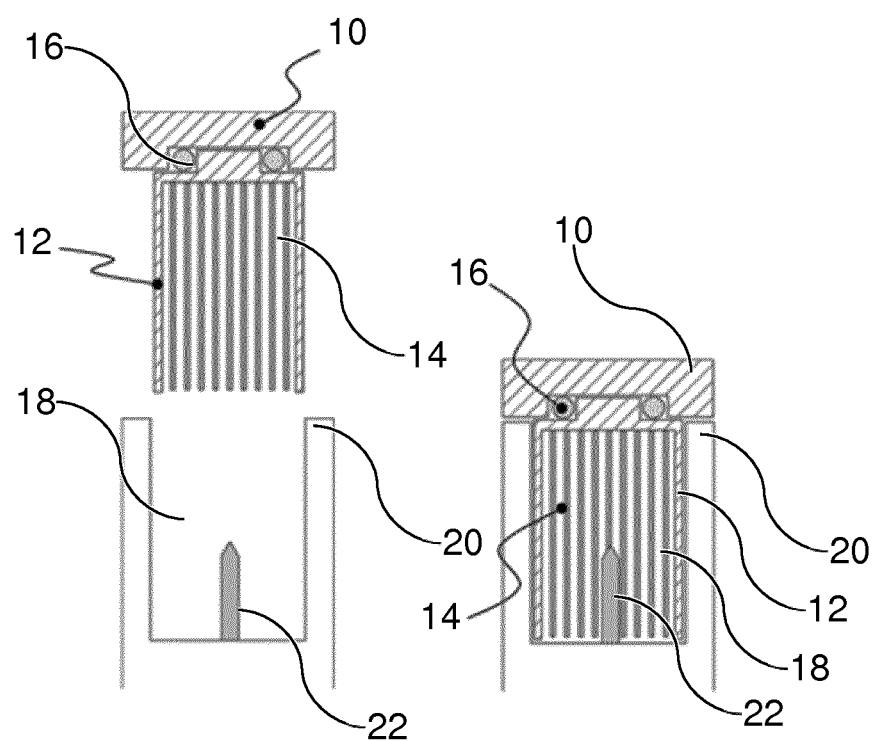

The invention will be described in more detail in the following with reference to the accompanying drawings, which show in:

FIG. 1: a cleaning tool according to the present invention;

FIG. 2: the cleaning tool according to the present invention inserted into a heating chamber of an aerosol-generating device; and FIG. 3: a cross-sectional view of the cleaning tool according to the present invention.

FIG. 1 shows a cleaning tool comprising a handle 10 and a main body 12. The handle 10 comprises grooves to facilitate gripping of the handle 10 by a user. Within the body 12, cleaning elements 14 are arranged. The cleaning elements 14 are attached to the main body 12. The cleaning elements 14 are configured as elongate brushes, which are arranged parallel to the longitudinal axis of the cleaning tool. The cleaning elements 14 are configured elastic.

Between the handle 10 and the main body 12, a gearing is arranged. The gearing is configured as a ball bearing 16. By means of the ball bearing 16, the handle 10 is rotatably attached to the main body 12.

FIG. 2 shows the operation of the cleaning tool according to the present invention. During operation, the main body 12 of the cleaning tool is inserted into a heating chamber 18 of an aerosol-generating device 20. Inside of the heating chamber 18, a heating element 22 is arranged. The heating element 22 has the shape of a heating blade. Thus, the heating element 22 may potentially be damaged by rotational force acting upon the heating element 22.

By means of the ball bearing 16, the handle 10 is configured freely rotatable with respect to the main body 12 and the cleaning elements 14. Rotation of the main body 12 and the cleaning elements 14 is thus prevented if the cleaning tool is—as intended—gripped at the handle 10 and inserted into the heating chamber 18 by means of the handle 10. During a cleaning operation, the cleaning elements 14 are thus moved parallel to the longitudinal axis of the heating element 22, i.e. up and down with respect to the heating element 22. A rotation of the cleaning elements 14 with respect to the heating element 22 is prevented. The heating element 22 may therefore be cleaned by longitudinal up and down movement of the cleaning tool or the aerosol-generating device 20, i.e. by relative longitudinal movement between the cleaning tool and the device 20. By this movement, at least one of the heating chamber 18 and the aerosol-generating device 20 may be additionally or alternatively cleaned. If a user tries to apply torque to the handle 10 by a twisting movement, the user will not be faced with any resistance. In this case, the handle 10 may rotate, but the main body 12 and therefore the cleaning elements 14 fixed to the main body 12 will not rotate. This minimizes risk of damage, particularly risk of damage to the heating element 22.

FIG. 2 also shows a button 24 of the aerosol generating device 20 for activating the heating element 22. Operation of the heating element 22 may be prevented during usage of the cleaning tool. For example a detection element such as a sensor or poka yoke may be arranged on the outer surface of the main body 12 such that the aerosol-generating device 20 detects that the cleaning tool has been inserted into the heating chamber 18. As a consequence, the operation of the heating element 22 may be prevented by a controller of the aerosol-generating device 20. The inner walls of the heating chamber 18 may comprise a corresponding detection element to interact with the detection element of the cleaning tool.

FIG. 3 shows a cross section of the cleaning tool and the heating chamber 18 of the aerosol-generating device 20. The cleaning elements 14 attached to a top portion of the main body 12 can be seen. Also, FIG. 3 shows the arrangement of the ball bearing 16 between the handle 10 and the main body 12. In this regard, the handle 10 is configured to integrally comprise an outer race of the ball bearing 16 and the main body 12 is configured to integrally comprise an inner race of the ball bearing 16. The ball bearing itself additionally comprise balls to facilitate smooth rotations of the handle 10 with respect to the main body 12 and to prevent rotation of the main body 12 and with it of the cleaning elements 14 during rotation of the handle 10. As depicted in FIG. 3, the cleaning elements 14 may have a length such that the cleaning elements 14 do not protrude from the main body 12. Thus, the cleaning elements 14 are protected by the main body 12 from damage. In some embodiments, the cleaning elements 14 may also be configured to have the same length as the main body 12 or even slightly protrude from the main body 12. This may facilitate cleaning of the base of the heating chamber 18 by the cleaning elements 14.

FIG. 3 also shows that the handle 10 has a larger diameter than the opening of the heating chamber 18. The handle 10 may have a diameter which corresponds to the outer diameter of the aerosol-generating device 20. The handle 10 may rest against the opening of the heating chamber 18 after insertion of the main body 10 into the heating chamber 18.

The invention claimed is:

1. A cleaning tool configured for cleaning a heating element arranged in a heating chamber of an aerosol-generating device, the cleaning tool comprising:
    a handle; and
    a main body,
wherein the main body comprises multiple cleaning elements, wherein the handle is rotatably attached to the main body such that rotation of the main body in the heating chamber is prevented and damage to the heating element is prevented, and wherein the main body has an elongate tubular shape and the multiple cleaning elements are arranged within the main body.

2. The cleaning tool according to claim 1, wherein the cleaning tool further comprises a bearing, and wherein the handle is rotatably attached to the main body by the bearing.

3. The cleaning tool according to claim 2, wherein the bearing is configured as a rotary bearing.

4. The cleaning tool according to claim 2, wherein the bearing comprises an outer race and an inner race, wherein the outer race is part of the handle, and wherein the inner race is part of the main body.

5. The cleaning tool according to claim 2, wherein the bearing is configured as a rolling-element bearing.

6. The cleaning tool according to claim 2, wherein the bearing is configured as a ball bearing.

7. The cleaning tool according to claim 1, wherein the rotational attachment between the handle and the main body is configured such that the handle can be rotated without rotation of the main body.

8. The cleaning tool according to claim 1, wherein the multiple cleaning elements have an elongate shape and are arranged parallel to the longitudinal axis of the cleaning tool.

9. The cleaning tool according to claim 1, wherein the multiple cleaning elements are configured as one or more of brushes, microfiber, cloth and foam.

10. The cleaning tool according to claim 1, wherein the multiple cleaning elements are elastic and configured to elastically encompass the heating element of the aerosol generating device, when the cleaning tool is inserted into a heating chamber of the aerosol generating device.

11. The cleaning tool according to claim 1, wherein the distribution density of the multiple cleaning elements in the main body increases towards a longitudinal axis of the cleaning tool.

12. The cleaning tool according to claim 1, wherein the main body comprises a detection element arranged to interact with a corresponding detection element of an aerosol-generating device for detecting that the cleaning tool is inserted into the heating chamber of the aerosol-generating device.

13. A system comprising:
    an aerosol-generating device, and
    a cleaning tool according to claim 1,
wherein the aerosol-generating device comprises a heating chamber and a heating element, wherein the heating element is arranged in the heating chamber, and wherein the cleaning tool is configured to be inserted into the heating chamber for cleaning the heating element.

14. The system according to claim 13, wherein the aerosol-generating device comprises a detection element to interact with a corresponding detection element of the cleaning tool for detecting that the cleaning tool has been inserted into the heating chamber of the aerosol-generating device.

15. A method for cleaning a heating element arranged in a heating chamber of an aerosol-generating device by means of a cleaning tool, the method comprising the following steps:
    providing a cleaning tool comprising a handle and a main body, wherein the main body comprises multiple cleaning elements arranged within the main body, and wherein the handle is rotatably attached to the main body such that rotation of the main body in the heating chamber is prevented and damage to the heating element is prevented, and wherein the main body has an elongate tubular shape, and
    inserting the cleaning tool into a heating chamber of the aerosol-generating device, thereby cleaning the heating element arranged in the heating chamber.

* * * * *